United States Patent
Helm et al.

(10) Patent No.: US 9,215,558 B2
(45) Date of Patent: Dec. 15, 2015

(54) METHOD FOR DIGITAL RADIO FRINGE AREA LEARNING

(71) Applicant: Toyota Motor Engineering & Manufacturing North America, Inc., Erlanger, KY (US)

(72) Inventors: Sean Lee Helm, Saline, MI (US); Mark Jotanovic, Troy, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 220 days.

(21) Appl. No.: 13/666,413

(22) Filed: Nov. 1, 2012

(65) Prior Publication Data

US 2014/0120842 A1 May 1, 2014

(51) Int. Cl.
*H04B 17/00* (2015.01)
*H04W 4/02* (2009.01)
*H04W 4/00* (2009.01)
*G08G 1/0968* (2006.01)

(52) U.S. Cl.
CPC ............. *H04W 4/021* (2013.01); *G08G 1/0968* (2013.01); *H04W 4/001* (2013.01)

(58) Field of Classification Search
CPC ...... H04W 24/00; H04W 24/08; H04B 17/00; H04B 17/0057
USPC ........................................ 455/421, 423, 115.3
See application file for complete search history.

(56) References Cited

U.S. PATENT DOCUMENTS

| 6,112,063 A * | 8/2000 | Ravi et al. ................... 455/186.1 |
| 6,992,619 B2 * | 1/2006 | Harrison .................... 342/357.51 |
| 7,953,183 B2 * | 5/2011 | Shridhar et al. ............... 375/316 |
| 8,417,239 B1 * | 4/2013 | DeCusatis et al. ............. 455/423 |
| 2003/0040272 A1 * | 2/2003 | Lelievre et al. .............. 455/3.06 |

* cited by examiner

*Primary Examiner* — April G Gonzales
(74) *Attorney, Agent, or Firm* — Dinsmore & Shohl LLP

(57) ABSTRACT

A system on a vehicle is provided operable to notify a user if and when they are approaching a low digital radio signal area. The vehicle includes both the capability to receive digital and analog radio signals. The system further includes a processor and a data storage unit. If the digital signal drops below a certain predetermined threshold, the system will record the location of the low signal and will notify the user of the low signal next time the user is approaching the same area recorded by the GPS.

18 Claims, 2 Drawing Sheets

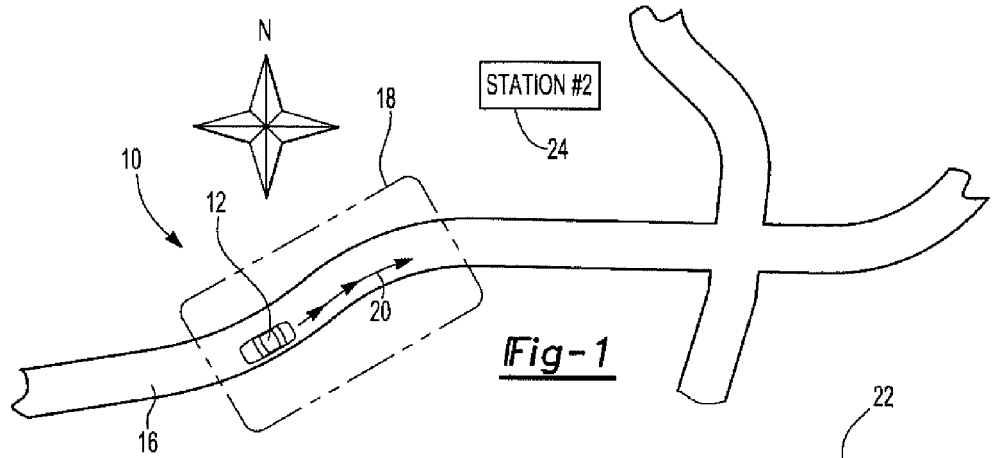
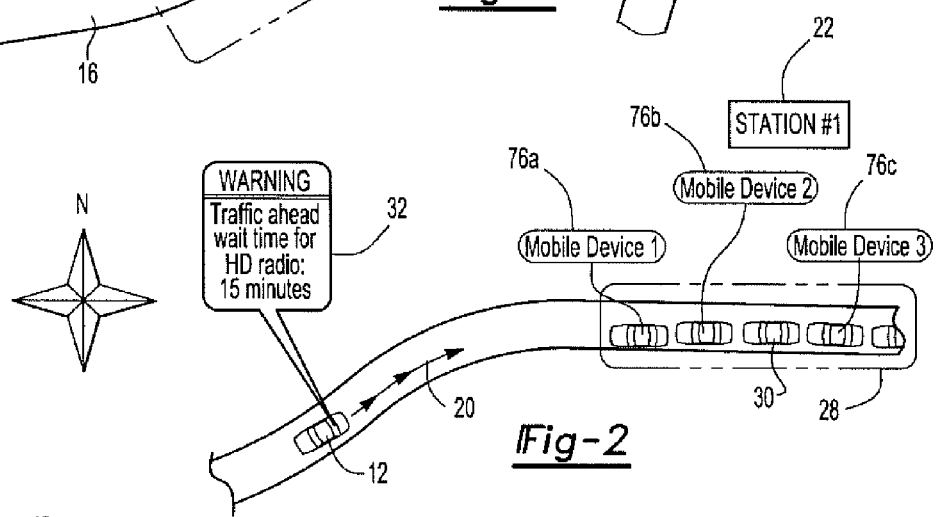
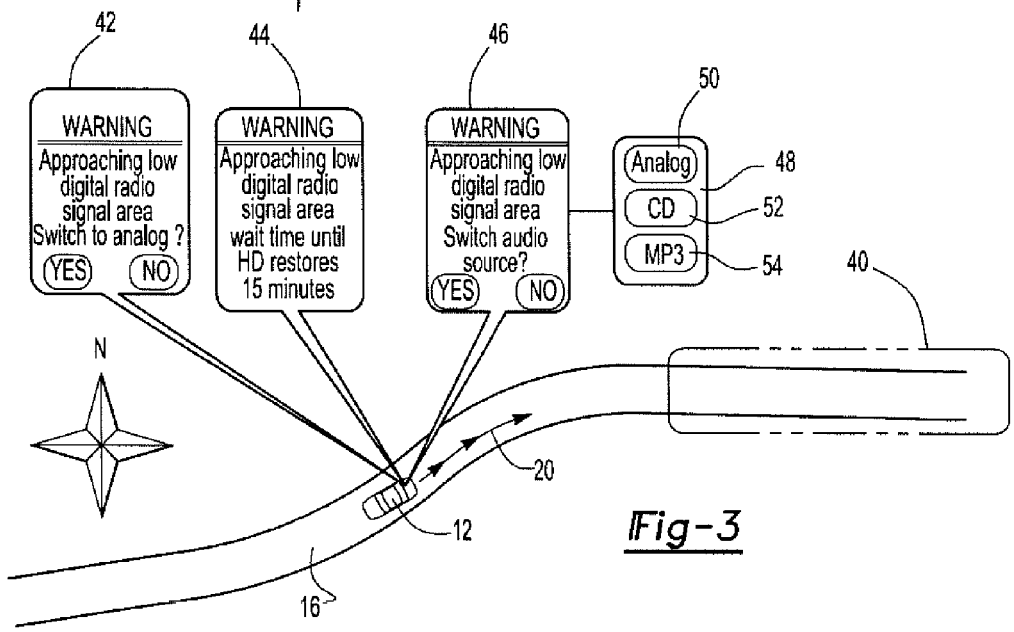

METHOD FOR DIGITAL RADIO FRINGE AREA LEARNING

FIELD OF THE INVENTION

This invention relates generally to digital radio systems. More particularly, this invention relates to a system for learning digital audio radio fringe areas.

BACKGROUND OF THE INVENTION

HD radio is a radio system used in the United States for broadcasting digital audio and other information. Radio stations are more frequently offering digital (commonly referred to as HD radio) or simulcast radio. During simulcast, a radio station broadcasts both digital and analog radio broadcasting the same content. Currently known digital radio systems automatically switch between the digital source and the analog source if the digital source drops its signal below a predetermined level. When the system makes the switch between analog and digital, the user may experience a slight delay, interruption in the content or perceptible changes in audio quality. In certain driving areas that are considered fringe areas, a user may drive through an off and on digital radio signal wherein experiencing frequent back and forth switching between digital and analog radio. Accordingly, there exists a need in the art to provide a system which prevents the constant and annoying switching between analog and digital radio and/or facilitates the reduced perception of the aforementioned switching.

SUMMARY OF THE INVENTION

A system is provided within a vehicle having GPS capability and includes the capability to receive digital radio audio signals. The system further includes a processor and a data storage unit. If the digital signal drops below a certain predetermined threshold, the system will record the location of the low signal and notify the user of the low signal next time the user is approaching the same area recorded by the GPS, or will apply some signal processing to reduce the perceived switching. Options may be provided to the user if the user is approaching the low digital signal fringe area. These options include switching and staying in analog, switching to an alternative audio source and/or providing wait times until the digital signal is restored. At that point, the system may automatically revert back to digital audio content.

BRIEF DESCRIPTION OF THE DRAWINGS

FIG. 1 illustrates a schematic view of a vehicle within a fringe area;

FIG. 2 illustrates a schematic view of a vehicle approaching a high traffic area;

FIG. 3 illustrates a schematic view of a vehicle approaching a fringe area and the vehicle providing various options to the user;

DETAILED DESCRIPTION OF THE INVENTION

Figure 4:
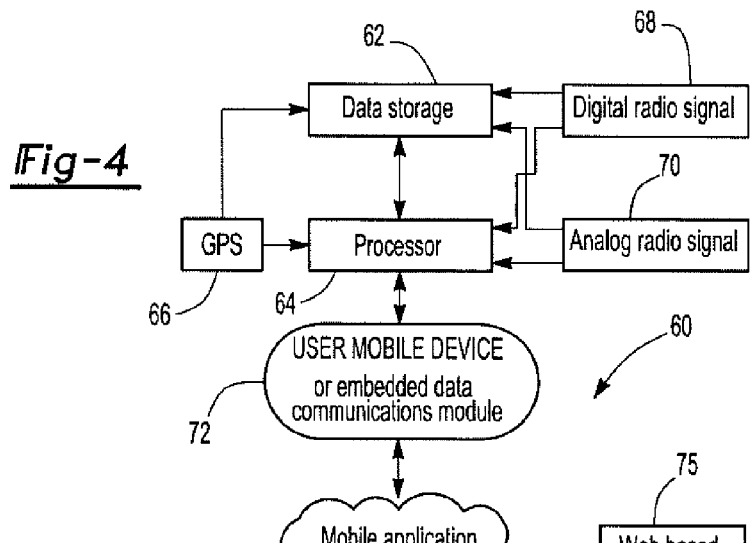
FIG. 4 illustrates the system and apparatus of the present invention.

The present invention relates to a system and method for learning areas of low digital radio signal in providing the user with options if the user is approaching a low digital radio signal area.

FIG. 1 illustrates a schematic view 10 of a vehicle 12 travelling down a road 16. A low digital signal area or fringe area 18 is provided. The fringe area 18 is an area for which the user of the vehicle 12 may experience repeated switching between analog and digital radio signals. The fringe area 18 may be different from channel to channel. For example, as shown in FIG. 1, station #1 22 is a farther distance away from the vehicle 12 than station #2 24. Due to the proximity of station #2 24 to the vehicle 12, the vehicle 12 may still easily receive the digital signal from station #2 24. However, station #1 22 is a substantial distance away from the vehicle 12. Accordingly, fringe area 18 is created because of the large distance created between the vehicle 12 and station #1 22. In the present embodiment, station #1 22 and station #2 24 both have a digital and analog radio signal.

However, in other embodiments, a station may have strictly an analog radio signal or strictly a digital radio signal. If a user approaches an area with a low digital signal coming from a station without an analog counterpart, the user experiences a dead zone. The present invention would allow for the user approaching a fringe area of a station not having an analog counterpart, to be prompted to select an alternative audio source. The system further reduces the interruption heard by the user. The perception of the switching between analog and digital signals is mitigated when the system is aware of an approaching low digital signal area. Rather than prompting the user with questions of switching sources, the system is also operable to minimize any interruption in the switch between digital and analog.

FIG. 2 illustrates a schematic view 10 of vehicle 12 on a road 16 travelling 20 to a fringe area 28. The fringe area 28 is a fringe area surrounding a high traffic area 30. If the vehicle 12 is travelling 20 towards the fringe area 28 surrounding the high traffic area 30, the system will notify the user of the high traffic area ahead. The system will provide a time in the form of a warning 32 to the user providing the anticipated time until digital radio will be available again.

FIG. 3 illustrates the various warning messages provided to a user of the vehicle 12. As the user of the vehicle 12 is travelling 20 along the road 16 and is approaching a fringe area 40, various messages may be provided to the user. By way of example, warning indicator 42 is provided on a display in the vehicle interior of the vehicle 12 to the user. Indicator 42 reads "Approaching low digital radio signal area—switch to analog?" The indicator 42 then provides button options: "Yes" and "No." The indicator 42 is provided to the user of the vehicle 12 as the vehicle 12 is approaching the fringe area 40. The indicator 42 is operable to allow the user to choose whether or not they want to stay in analog for an uninterrupted audio experience. If the user chooses not to stay in analog and to switch between digital and analog, the user may experience frequent switches between digital and analog radio signals.

Alternatively, FIG. 3 illustrates a warning indicator 44 providing the wait time until digital radio restores. Indicator 44 reads "Approaching low digital radio signal area—wait time until digital restores: 15 minutes". The warning indicator 44 is provided once the system has learned and stored data and is able to provide the time data to the user of the vehicle 12.

In yet another embodiment, a warning indicator 46 is provided to the user of the vehicle 12 allowing the user to choose to switch to another audio source. The warning indicator 46 reads "Approaching low digital radio signal area. Switch audio source?" The indicator 46 then provides "yes" or "no" buttons allowing the user of the vehicle 12 to choose whether or not they want to switch the audio source. A follow up menu indicator 48 may also be provided allowing the user to switch the audio source to analog 50, CD 52, MP3 54, etc.

The system 60 of the present invention is shown in FIG. 4. The system includes a data storage unit 62 and a processor 64. The processor 64 determines whether or not to delete or update information to the data storage unit 62. The processor 64 and the data storage unit 62 are both provided connected to a GPS system 66. The GPS system 66 is provided on the vehicle 12. The vehicle 12 further includes a digital radio signal accepting apparatus and an analog radio signal accepting apparatus. The digital radio signal 68 and the analog radio signal 70 is determined and calculated in terms of percentage of strength of signal. The strength of the digital radio signal 68 and the analog radio signal 70 is communicated to the data storage unit 62 and/or the processor 64. Data from the GPS system 66 is also communicated to the data storage unit 62 and the processor 64. Data from the GPS system 66 and data from the digital radio signal 68 and the analog radio signal 70 are stored correspondingly within the data storage unit 62. Alternatively, data from the GPS system 66 and data from the digital radio signal 68 and the analog radio signal 70 is processed within the processor 64 before stored in the data storage unit 62.

By way of example, if a user is travelling into a low digital radio signal area or fringe area, the GPS is activated and determines the location of the low digital radio signal area. As the user is driving into a fringe area having a digital radio signal of less than 50%, the GPS records the location of the vehicle 12. When the user returns to the same area, the user may be prompted by one of the various warning indicators as shown in FIGS. 2 and 3 to make a selection. If the system 60 detects any switching between digital radio signal 68 and analog radio signal 70, or loss of reception of the digital radio signal 68, the system 60 records the GPS system 66 coordinates for that fringe area. Upon subsequent visits to the known fringe area, the system 60 will automatically allow only one switch to analog within the fringe area and will automatically enable digital radio signal reception after leaving the fringe area. Only the frequency or radio station signal from which the fringe area reception was detected will be affected. Other frequencies or radio station signals will be treated separately.

The system will further teach and recheck the signal of the digital radio signal 68 each time the user passes through a fringe area. As radio stations improve and digital radio signals 68 improve, the system 60 will continue to collect GPS system 66 data and digital radio signal 68 data. If the digital radio signal 68 improves in corresponding to the GPS coordinates, the system will learn and store that data for subsequent visits through the fringe area.

FIG. 4 further illustrates communication, learning and sharing between mobile devices of various users of the system 60. A user mobile device 72 is provided with communication to mobile application cloud storage and/or crowd sourcing 74. Alternatively, an embedded communications module within the vehicle may be implemented. An embedded communications module would function and communicate similar to a user mobile device 72. Various mobile devices 76A, 76B, 76C communicate to the cloud and to the user mobile device 72. Data collected from the user mobile devices 76A, 76B, 76C communicate GPS coordinate information and digital radio signal information to the cloud and thus communicate this information to the user mobile device 72. Data collected by the user mobile device 72 may be uploaded to the processor 64 and/or the data storage unit 62 to provide a larger database of GPS coordinates in corresponding digital radio signal strengths. This abundance of information will improve the quality and accuracy of approaching fringe areas.

Figure 5:
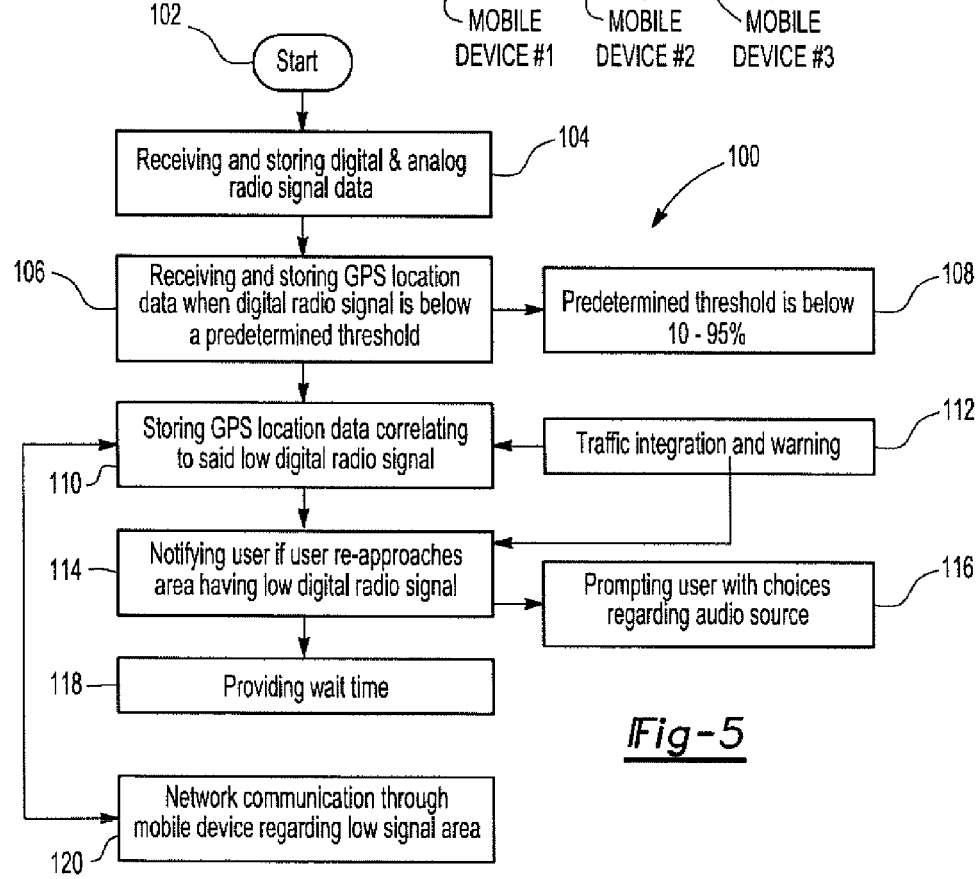
FIG. 5 illustrates a method of the present invention.

FIG. 5 shows the present invention further providing a method 100 of preventing lost audio sources. The method 100 starts 102 and receives and stores digital and radio signal data 104. The system simultaneously receives and stores GPS location data when the digital radio signal data 104 is below a predetermined percentage 106. In the present embodiment, the predetermined percentage may vary between 10% and 95% of the signal strength 108. The system then stores the GPS location data correlating to the low digital radio signal 110. The system may provide traffic integration and warnings 112. The next step includes notifying 114 if the user re-approaches the area having a low digital radio signal. The user may then be prompted 116 with choices regarding audio sources. The user may also be provided 118 a wait time until the digital radio signal returns. The system may also communicate through a mobile device 120 and download/upload data regarding GPS coordinates and digital radio signals.

The method 100 for notifying a user when they are approaching a low digital radio signal area start 102 with a system having a digital radio receiver, a GPS system 66, a processor 64, and a data storage unit 62. The method 100 includes the steps of receiving digital radio signal data 104 by the digital radio receiver, determining a signal strength 108 of the digital radio signal, receiving a corresponding set of GPS coordinates 106 if the strength of the digital radio signal is below a predetermined percentage, storing the digital radio signal 110 and the corresponding set of GPS coordinates in the data storage unit, detecting (related to 108, 110) when the user is re-approaching an area having the strength below the predetermined percentage or threshold based on the corresponding set of GPS coordinates and notifying 114 the user that they are approaching an area having the strength below the predetermined threshold. The predetermined threshold may be a percentage calculation or determination by other means of determining a signal strength (i.e. subjective comparisons, objective comparisons, specific numbers, etc.).

FIGS. 4 and 5 in further detail are described as follows: The method 100 communicates to a mobile application on the user's mobile device, the mobile device connecting to a shared web based storage unit 75. Digital radio signal data and the corresponding set of GPS coordinates data is uploaded to the shared web based storage unit 75 through the user mobile device 72. Further, a set of third party radio signal data and a set of third party corresponding set of GPS coordinates data are uploaded to the shared web based storage unit 75 through the various mobile devices 76A, 76B, 76C. The digital radio signal data, the corresponding set of GPS coordinates data, the set of third party radio signal data and the set of third party corresponding set of GPS coordinates data is shared and exchanged through the web based data storage unit. This crowd sourcing 74 allows the user to gather more information and data to further improve and make more accurate the method 100.

The invention is not restricted to the illustrated examples and embodiments described above. The embodiments are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the appended claims.

The invention claimed is:

1. A method for notifying a user when they are approaching a low digital radio signal area, the method having a digital radio receiver, a GPS signal receiver, a processor, and a data storage unit, the system including the steps of:

receiving a digital radio signal by the digital radio receiver, determining by a processor a strength of the digital radio signal;

receiving a corresponding set of GPS coordinates by the GPS signal receiver if the strength of the digital radio signal is below a predetermined threshold;

storing the digital radio signal strength and the corresponding set of GPS coordinates in the data storage unit;

detecting when the user is re-approaching an area having the strength below the predetermined threshold based on the corresponding set of GPS coordinates;

notifying the user that they are approaching an area having the strength below the predetermined threshold; and supplying to the user on a display in a vehicle, a wait time until a strong digital radio signal returns.

2. The system for notifying a user when they are approaching a low digital radio signal area of claim 1 wherein the predetermined threshold ranges between 10-95%.

3. The system for notifying a user when they are approaching a low digital radio signal area of claim 1 wherein the user is notified on a display screen illustrating a map of the user's current location.

4. The system for notifying a user when they are approaching a low digital radio signal area of claim 2 wherein the user is shown a fringe area graphically illustrating the location of the digital radio signal strength below the predetermined threshold.

5. The system for notifying a user when they are approaching a low digital radio signal area of claim 1 wherein a separate signal strength is determined for every digital radio signal within range.

6. The system for notifying a user when they are approaching a low digital radio signal area of claim 2 wherein the user is provided with a map and warning indicator of approaching traffic.

7. The system for notifying a user when they are approaching a low digital radio signal area of claim 6 wherein the user is provided with an approximated wait time until the digital signal will return.

8. The system for notifying a user when they are approaching a low digital radio signal area of claim 1 wherein the user is supplied with options regarding a choice of audio source if they are approaching a set of corresponding GPS coordinates where strength of the digital radio signal is below the predetermined threshold.

9. The system for notifying a user when they are approaching a low digital radio signal area of claim 8 wherein the user is given the option to switch to analog radio.

10. The system for notifying a user when they are approaching a low digital radio signal area of claim 8 wherein the user is given the option to switch to CD.

11. The system for notifying a user when they are approaching a low digital radio signal area of claim 8 wherein the user is given the option to switch to MP3 or other digital media.

12. The system for notifying a user when they are approaching a low digital radio signal area of claim 1 wherein the system communicates to a mobile application on the user's mobile device, the mobile device connecting to a shared web based storage unit.

13. The system for notifying a user when they are approaching a low digital radio signal area of claim 12 wherein the digital radio signal data and the corresponding set of GPS coordinates data is uploaded to the shared web based storage unit.

14. The system for notifying a user when they are approaching a low digital radio signal area of claim 13 wherein a set of third party radio signal data and a corresponding set of third party GPS coordinates data is uploaded to the shared web based storage unit.

15. The system for notifying a user when they are approaching a low digital radio signal area of claim 14 wherein the digital radio signal data, the corresponding set of third party GPS coordinates data, and the set of third party radio signal data are shared and exchanged through the web based data storage unit.

16. A system for notifying a user when they are approaching a low digital radio signal area, the system comprising:

a digital radio receiver, the digital radio receiver receiving a digital radio signal;

a processor connected to the digital radio receiver to determine the strength of the digital radio signal;

a GPS signal receiver to receive GPS coordinates; and a data storage unit, the data storage unit to store both GPS coordinates and digital radio signal strength data;

wherein the processor of the system detects when the user is re-approaching an area having the strength below a predetermined threshold based on a corresponding set of GPS coordinates and wherein the system notifies the user that they are approaching an area having a signal strength below the predetermined threshold;

wherein the user is supplied on a display in a vehicle, a wait time until a strong digital radio signal returns.

17. A method for notifying a user when they are approaching a low digital radio signal area, the method having a digital radio receiver, a GPS signal receiver, a processor, and a data storage unit, the system including the steps of:

receiving a digital radio signal by the digital radio receiver, determining by a processor a strength of the digital radio signal;

receiving a corresponding set of GPS coordinates by the GPS signal receiver if the strength of the digital radio signal is below a predetermined threshold;

storing the digital radio signal strength and the corresponding set of GPS coordinates in the data storage unit;

detecting when the user is re-approaching an area having the strength below the predetermined threshold based on the corresponding set of GPS coordinates;

notifying the user that they are approaching an area having the strength below the predetermined threshold; and supplying the user with options regarding a choice of audio source if they are approaching a set of corresponding GPS coordinates where strength of the digital radio signal is below the predetermined threshold.

18. The system for notifying a user when they are approaching a low digital radio signal area of claim 17 wherein the user is supplied with a wait time until a strong digital radio signal returns.

* * * * *